United States Patent
Umeyama et al.

(10) Patent No.: US 10,193,122 B2
(45) Date of Patent: Jan. 29, 2019

(54) NON-AQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Harunari Shimamura, Toyonaka (JP); Yusuke Fukumoto, Toyonaka (JP); Koichi Toriyama, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 85 days.

(21) Appl. No.: 15/260,474

(22) Filed: Sep. 9, 2016

(65) Prior Publication Data
US 2017/0077478 A1    Mar. 16, 2017

(30) Foreign Application Priority Data
Sep. 10, 2015  (JP) .................................. 2015-178677

(51) Int. Cl.
*H01M 2/16*    (2006.01)

(52) U.S. Cl.
CPC ......... *H01M 2/1686* (2013.01); *H01M 2/166* (2013.01); *H01M 2/1653* (2013.01)

(58) Field of Classification Search
None
See application file for complete search history.

(56) References Cited

FOREIGN PATENT DOCUMENTS

JP    2014-180822 A    9/2014

*Primary Examiner* — Wyatt P McConnell
(74) *Attorney, Agent, or Firm* — Sughrue Mion, PLLC (57) ABSTRACT

A separator includes a base material layer and a heat resistance layer. The heat resistance layer includes, in a direction of thickness of the heat resistance layer, a central portion and a first end portion and a second end portion between which the central portion lies. The first end portion includes an interface with an electrode. The second end portion includes an interface with the base material layer. A composition ratio of a resin binder to a total mass of inorganic particles and the resin binder in the first end portion and the second end portion is not lower than 8 mass % and not higher than 30 mass %. A composition ratio of the resin binder to a total mass of the inorganic particles and the resin binder in the central portion is not lower than 2 mass % and not higher than 7 mass %.

3 Claims, 7 Drawing Sheets

DIRECTION OF
THICKNESS

NON-AQUEOUS ELECTROLYTE SECONDARY BATTERY

This nonprovisional application is based on Japanese Patent Application No. 2015-178677 filed with the Japan Patent Office on Sep. 10, 2015, the entire contents of which are hereby incorporated by reference.

BACKGROUND OF THE INVENTION

Field of the Invention

The present invention relates to a non-aqueous electrolyte secondary battery.

Description of the Background Art

Japanese Patent Laying-Open No. 2014-180822 discloses a separator for a battery in which a first heat resistance layer and a second heat resistance layer different from each other in particle size of inorganic particles are stacked on a surface of a base material layer formed from a porous film made of a resin.

SUMMARY OF THE INVENTION

According to Japanese Patent Laying-Open No. 2014-180822, by forming a heat resistance layer containing inorganic particles on a surface of the base material layer made of the resin, heat shrinkage of the separator can be suppressed even at the time when a temperature of the battery increases, for example, due to overcharging. This is because the inorganic particles are higher in melting point than the resin forming the base material layer.

According to the studies conducted by the present inventor, a heat resistance layer and an electrode (a positive electrode or a negative electrode) are desirably in intimate contact with each other in a battery. When a gap is created between a heat resistance layer, that is, a separator, and an electrode, a distance between electrodes or a distribution of an electrolyte solution is varied and an electrode reaction is not uniform.

In applications in which charging and discharging under a high load is required such as vehicle-mount applications, however, adhesion between the heat resistance layer and the electrode may become low, because the electrode facing the heat resistance layer considerably expands or contracts with charging and discharging under the high load.

When adhesion between the heat resistance layer and the base material layer is low, the base material layer and the heat resistance layer may be separated from each other when a temperature of the battery increases, and an effect of suppression of heat shrinkage of the separator may lower.

The present invention was made in view of the problems above. An object of the present invention is to provide a non-aqueous electrolyte secondary battery in which lowering in performance due to lowering in adhesion of a heat resistance layer to an electrode and a base material layer is suppressed.

[1] A non-aqueous electrolyte secondary battery includes a separator and an electrode. The separator includes a base material layer and a heat resistance layer arranged on a surface of the base material layer. The heat resistance layer contains inorganic particles and a resin binder. The electrode faces the heat resistance layer. The heat resistance layer includes, in a direction of thickness of the heat resistance layer, a central portion and a first end portion and a second end portion between which the central portion lies. The first end portion includes an interface with the electrode. The second end portion includes an interface with the base material layer. A composition ratio of the resin binder to a total mass of the inorganic particles and the resin binder in the first end portion and the second end portion is not lower than 8 mass % and not higher than 30 mass %. A composition ratio of the resin binder to a total mass of the inorganic particles and the resin binder in the central portion is not lower than 2 mass % and not higher than 7 mass %.

In the heat resistance layer in [1], a composition ratio of the resin binder is locally high in the vicinity of the interface between the heat resistance layer and the electrode (in the first end portion) and in the vicinity of the interface between the heat resistance layer and the base material layer (in the second end portion). Namely, the composition ratio of the resin binder in the first end portion and the second end portion is not lower than 8 mass %, and the composition ratio of the resin binder in the central portion lying between the first end portion and the second end portion is not higher than 7 mass %. Thus, adhesion which can allow resistance even to charging and discharging under a high load is realized at the interface between the heat resistance layer and the electrode. Furthermore, separation of the heat resistance layer and the base material layer from each other can be suppressed at the interface between the heat resistance layer and the base material layer when a temperature increases, for example, at the time of overcharging.

According to the studies conducted by the present inventor, when the composition ratio of the resin binder in the first end portion is lower than 8 mass %, a gap is created between the heat resistance layer and the electrode and deterioration in performance may be aggravated, for example, at the time of charging and discharging under a high load required in vehicle-mount applications.

When the composition ratio of the resin binder in the second end portion is lower than 8 mass %, the heat resistance layer may be separated from the base material layer when a temperature of the battery increases due to overcharging.

In the heat resistance layer, the inorganic particles also function to provide a cavity for ion permeation. When a composition ratio of the inorganic particles is excessively low (that is, a composition ratio of the resin binder is excessively high), ion permeability lowers and deterioration in performance may be aggravated.

In the non-aqueous electrolyte secondary battery in [1], the composition ratio of the resin binder in the first end portion and the second end portion is not higher than 30 mass %. Ion permeability in the first end portion and the second end portion can thus be ensured.

In the non-aqueous electrolyte secondary battery in [1], the composition ratio of the resin binder in the central portion is set to be low (that is, the composition ratio of the inorganic particles is high). According to the studies conducted by the present inventor, the composition ratio of the resin binder in the central portion is set to 7 mass % or lower, so that ion permeability in the entire heat resistance layer can be sufficient. The composition ratio of the resin binder in the central portion is set to 2 mass % or higher. When the composition ratio of the resin binder in the central portion is lower than 2 mass %, adhesion of each portion in the heat resistance layer lowers and hence an effect of suppression of heat shrinkage of the separator may be lowered.

[2] Preferably, the first end portion and the second end portion contain an organic solvent based binder as the resin binder and the central portion contains a water based binder as the resin binder. Alternatively, preferably, the first end portion and the second end portion contain the water based binder as the resin binder and the central portion contains the organic solvent based binder as the resin binder.

When all of the first end portion, the central portion, and the second end portion are formed of any one of the organic solvent based binder and the water based binder, the solvent and the resin binder are compatible and mixed with each other at the interface between portions. Then, difference in composition ratio between the portions may be lessened and an effect expected in [1] may lower. By alternately employing the organic solvent binder and the water based binder for the portions, the portions can be prevented from being compatible and mixed with each other. Since the portions are successively formed as the resin binder is changed, segregation of the resin binder can be suppressed in the heat resistance layer as a whole.

[3] Preferably, the first end portion and the second end portion each have a thickness not smaller than 1 μm and not greater than 3 μm. Preferably, the central portion has a thickness not smaller than 1.5 μm and not greater than 6 μm. Improvement in effect of suppression of lowering in performance can be expected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One example of an embodiment of the present invention (hereinafter denoted as the "present embodiment") will be described hereinafter. The present embodiment is not limited to the description below. A non-aqueous electrolyte secondary battery may simply be denoted as a "battery" below. An "electrode" refers to at least one of a positive electrode and a negative electrode. In an expression including an ordinal number such as "first", the ordinal number is used for distinguishing one feature from another and does not have any more limitative sense.

<Non-Aqueous Electrolyte Secondary Battery>

Figure 1:
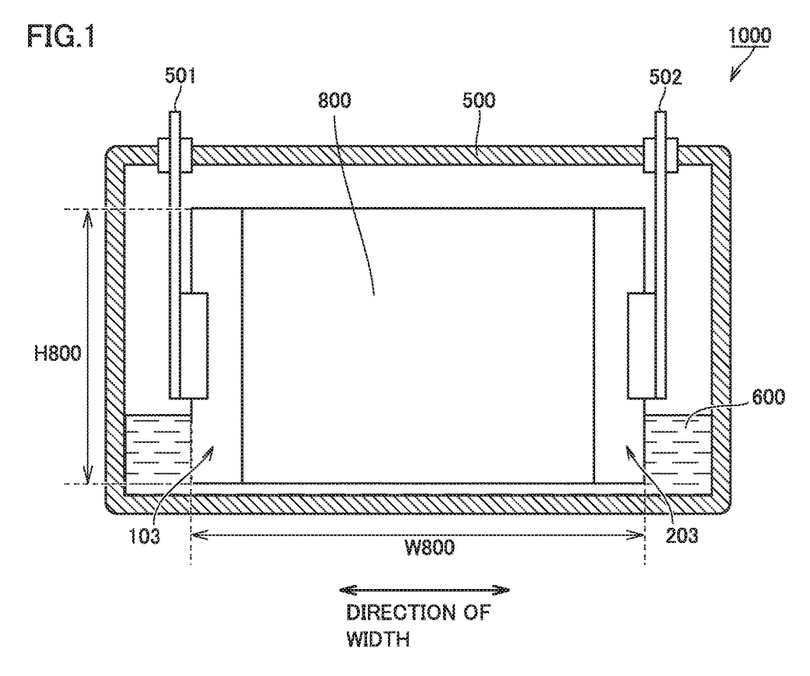
FIG. 1 is a schematic cross-sectional view showing one example of a construction of a non-aqueous electrolyte secondary battery according to an embodiment of the present invention.

FIG. 1 is a schematic cross-sectional view showing one example of a construction of a non-aqueous electrolyte secondary battery according to the present embodiment. A battery 1000 is a battery in a prismatic shape used, for example, for vehicle-mount applications. Battery 1000 has a rated capacity, for example, approximately from 1 to 30 Ah (typically from 4 to 25 Ah). Battery 1000 includes a battery case 500.

Battery case 500 may be made, for example, of an aluminum (Al) alloy. Battery case 500 is typically constituted of a case main body in a prismatic shape with a bottom and a lid. The case main body and the lid are integrated, for example, by laser welding. Battery case 500 is provided with a positive electrode terminal 501 and a negative electrode terminal 502 which are external terminals. Battery case 500 may be provided with a liquid injection port, a safety valve, and a current interrupt device.

Battery case 500 accommodates an electrode assembly 800 and an electrolyte solution 600. Electrode assembly 800 has a current-collector-exposed portion 103 in which a positive electrode current collector is exposed through a separator at one end in a direction of width and has a current-collector-exposed portion 203 in which a negative electrode current collector is exposed through the separator at the other end in the direction of width. Electrode assembly 800 is connected to positive electrode terminal 501 in current-collector-exposed portion 103 and connected to negative electrode terminal 502 in current-collector-exposed portion 203. Electrolyte solution 600 is stored in a bottom portion of battery case 500. The electrolyte solution permeates also into the inside of electrode assembly 800.

<<Electrode Assembly>>

Figure 2:
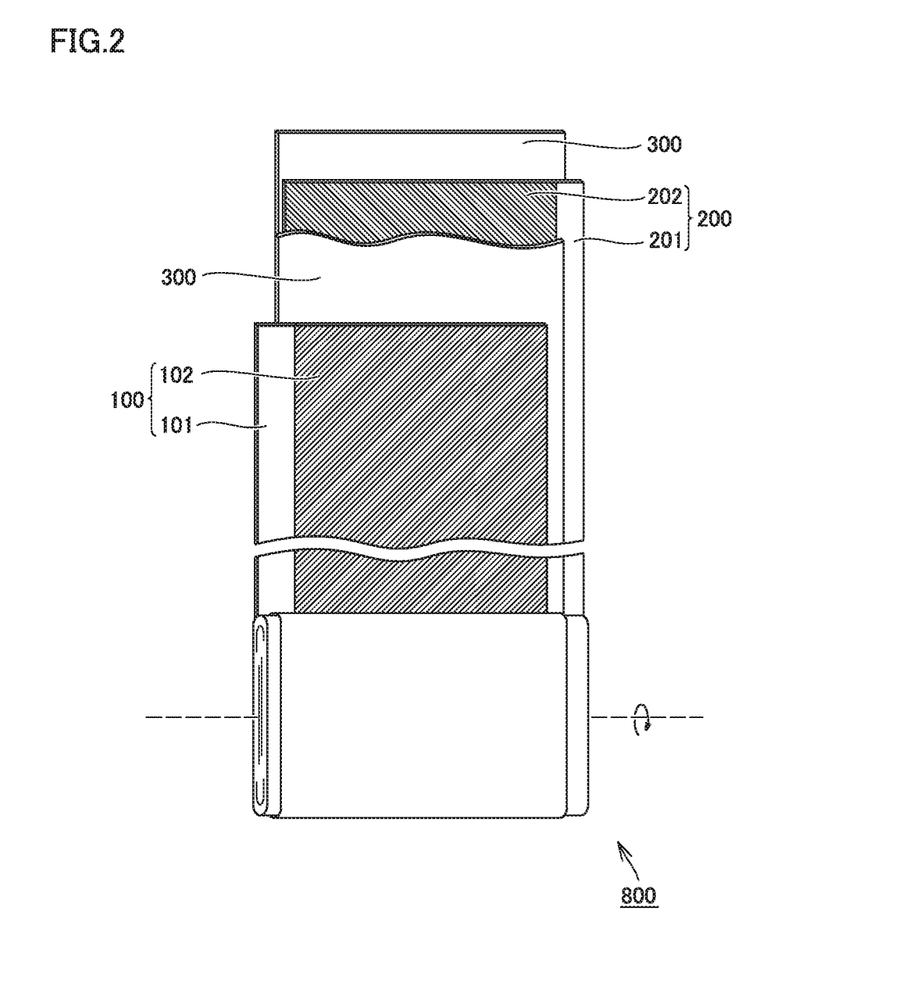
FIG. 2 is a schematic diagram showing one example of a construction of an electrode assembly.

The non-aqueous electrolyte secondary battery includes an electrode and a separator. The electrode and the separator make up the electrode assembly. FIG. 2 is a schematic diagram showing one example of a construction of the electrode assembly. Electrode assembly 800 is a wound electrode assembly. A positive electrode 100, a negative electrode 200, and a separator 300 forming electrode assembly 800 are each formed from a band-shaped sheet member. Electrode assembly 800 is obtained by stacking positive electrode 100, negative electrode 200, and separator 300 and then winding these components such that separator 300 is interposed between positive electrode 100 and negative electrode 200. Electrode assembly 800 is press-formed such that its outer geometry is flat after winding. A heat resistance layer forming a surface of the separator and the electrode are in intimate contact with each other owing to a pressure applied in a direction of stack of the electrode and the separator.

<<Separator>>

Figure 3:
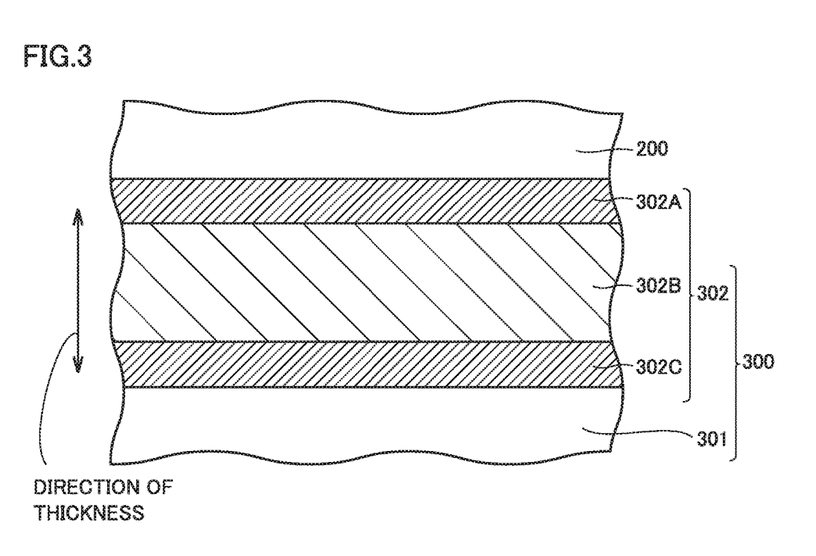
FIG. 3 is a schematic cross-sectional view showing an interface between an electrode and a separator.

FIG. 3 is a schematic cross-sectional view showing an interface between the electrode and the separator. Separator 300 includes a base material layer 301 and a heat resistance layer 302 arranged on base material layer 301.

(Base Material Layer)

The base material layer may be formed from a microporous film made of a resin or a nonwoven fabric obtained by intertwining resin fibers. The base material layer desirably has a shut-down function. The shut-down function refers to a function to cut off a current (ion permeation) as pores in the base material layer close when a temperature of a battery increases. Examples of the base material layer having the shut-down function include, for example, a porous film composed of polyolefin such as polyethylene (PE) or polypropylene (PP).

The base material layer may be formed from a single layer or a plurality of layers. For example, the base material layer may have a single-layered structure formed from a PE microporous layer (hereinafter denoted as a "PE" layer). The base material layer may have a two-layered structure in which, for example, a PE layer and a PP microporous layer (hereinafter denoted as a "PP layer") are stacked. Alternatively, the base material layer may have a three-layered structure in which, for example, a PE layer and a PP layer are stacked in the order of the PP layer/the PE layer/the PP layer. In the present embodiment, the base material layer having the three-layered structure of the PP layer/the PE layer/the PP layer is particularly suitable.

The base material layer has a thickness, for example, approximately from 9 to 30 μm (typically, approximately from 10 to 20 μm). When the base material layer includes a PP layer, the PP layer has a thickness, for example, approximately from 3 to 10 μm. When the base material layer includes a PE layer, the PE layer has a thickness, for example, approximately from 3 to 10 μm. The base material layer has Gurley permeability (permeability measured with the Gurley method), for example, approximately not less than 100 sec./100 ml and not more than 300 sec./100 ml.

(Heat Resistance Layer)

The heat resistance layer is formed on a surface of the base material layer. The heat resistance layer may be arranged on one surface of the base material layer or on both surfaces thereof.

The heat resistance layer contains inorganic particles and a resin binder. The heat resistance layer may be composed substantially only of inorganic particles and a resin binder. The inorganic particles may be particles of a metal oxide such as a alumina (α $Al_2O_3$), boehmite (AlOOH), titania ($TiO_2$), zirconia ($ZrO_2$), and magnesia (MgO). One type alone of inorganic particles may be used, or two or more types of inorganic particles may be used together. Namely, inorganic particles may be at least one type selected from the group consisting of α alumina, boehmite, zirconia, and magnesia. The inorganic particles may have d50, for example, approximately from 0.2 to 2 μm. "d50" represents a particle size (also referred to as a "median diameter") at an integrated value 50% in volume-based particle size distribution obtained with a laser diffraction scattering method.

As shown in FIG. 3, heat resistance layer 302 includes, in a direction of thickness thereof, a central portion 302B and a first end portion 302A and a second end portion 302C between which central portion 302B lies. First end portion 302A includes an interface with an electrode (negative electrode 200). Second end portion 302C includes an interface with base material layer 301. Though FIG. 3 shows the negative electrode as an electrode facing the heat resistance layer, the positive electrode naturally may face the heat resistance layer.

(Resin Binder for Heat Resistance Layer)

In the present embodiment, preferably, first end portion 302A and second end portion 302C are different from central portion 302B in type of the resin binder.

Preferably, first end portion 302A and second end portion 302C contain an organic solvent based binder as the resin binder and central portion 302B contains a water based binder as the resin binder. Alternatively, preferably, first end portion 302A and second end portion 302C contain a water based binder as the resin binder and central portion 302B contains an organic solvent based binder as the resin binder.

Thus, at a boundary between first end portion 302A and central portion 302B and at a boundary between central portion 302B and second end portion 302C, the portions are prevented from being compatible and mixed with each other and a desired composition ratio tends to be achieved in each portion.

The "water based binder" refers to a resin binder which is dispersible in a water based solvent. Being dispersible here also encompasses being soluble.

Examples of a water based binder include an acrylic resin, styrene-butadiene rubber (SBR), polytetrafluoroethylene (PTFE), polyvinyl alcohol (PVA), polyvinyl butyral (PVB), polyvinylpyrrolidone (PVP), and polyethylene glycol (PEG), as well as a mixture and a copolymer thereof. Namely, the water based binder may be at least one selected from the group consisting of an acrylic resin, SBR, PTFE, PVA, PVB, PVP, and PEG. A copolymer herein may be an alternate copolymer, a random copolymer, a block copolymer, or a graft copolymer. In the present embodiment, an acrylic resin is particularly suitable as the water based binder.

The acrylic resin refers to a resin obtained by polymerizing polymeric monomers having a (meth)acryloyl group, such as (meth)acrylic acid or (meth)acrylic ester. The acrylic resin may be a homopolymer (for example, polyacrylic acid (PAA)) or a copolymer (for example, acrylic acid ester-styrene copolymer) of polymeric monomers. The acrylic resin may be a modified acrylic resin of which part has been modified. For example, in PAA, some or all of hydrogen atoms in a carboxyl group may be substituted with sodium (Na). "(Meth)acryl" refers to at least one of acryl and methacryl and "(meth)acryloyl" refers to at least one of acryloyl and methacryloyl.

The water based solvent may be water or a mixed solvent of water and alcohol. Examples of alcohol which can be mixed with water include methanol, ethanol, and isopropanol (IPA). A ratio of mixing between water and alcohol may be set, for example, approximately to water:alcohol=99:1 to 50:50 in mass ratio. From a point of view of ease in handling, water is most preferred as the water based solvent.

The "organic solvent based binder" refers to a resin binder which is dispersible in an organic solvent. Examples of the organic solvent based binder include polyvinylidene difluoride (PVDF), a copolymer (a VDF-HFP copolymer) of vinylidene difluoride (VDF) and hexafluoropropylene (HFP), an aramid-based resin, a polyimide-based resin, a polyamide-imide based resin, and polyacrylonitrile (PAN), as well as a mixture and a copolymer thereof. Namely, the organic solvent based binder may be at least one selected from the group consisting of PVDF, a VDF-HFP copolymer, an aramid-based resin, a polyimide-based resin, a polyamide-imide based resin, and PAN. In the present embodiment, PVDF is particularly suitable as the organic solvent based binder.

The aramid-based resin refers to a resin obtained by condensation polymerization between aromatic polyamine and aromatic polycarboxylic acid. Examples of aromatic polyamine include p-phenylenediamine and m-phenylenediamine. Examples of aromatic polycarboxylic acid include terephthalic acid. For example, carboxylic acid chloride such as terephthaloyl dichloride may be employed instead of aromatic polycarboxylic acid. The aramid-based resin may be para-aramid or meta-aramid.

The organic solvent may be, for example, N-methyl-2-pyrrolidone (NMP), tetrahydrofuran (THF), dimethylformamide (DMF), methyl ethyl ketone (MEK), and dimethyl sulfoxide (DMSO), as well as a mixture thereof.

(Composition Ratio of Resin Binder in Heat Resistance Layer)

The present embodiment requires that first end portion 302A and second end portion 302C are different from central portion 302B in composition ratio of the resin binder.

In first end portion 302A and second end portion 302C, a composition ratio of the resin binder to a total mass of the inorganic particles and the resin binder is not lower than 8 mass % and not higher than 30 mass % (that is, the composition ratio of the inorganic particles is not lower than 70 mass % and not higher than 92 mass %). In central portion 302B, a composition ratio of the resin binder to a total mass of the inorganic particles and the resin binder is not lower than 2 mass % and not higher than 7 mass % (that is, the composition ratio of the inorganic particles is not lower than 93 mass % and not higher than 98 mass %).

By setting the composition ratio of the resin binder in the first end portion to be not lower than 8 mass % and not higher than 30 mass %, adhesion between the first end portion and the electrode is improved and ion permeability in the first end portion can be ensured.

By setting a composition ratio of the resin binder in the second end portion to be not lower than 8 mass % and not higher than 30 mass %, adhesion between the second end portion and the base material layer is improved and ion permeability in the second end portion can be ensured.

The composition ratio of the resin binder in the first end portion and the composition ratio of the resin binder in the second end portion may be equal to each other or may be different from each other. From a point of view of ion permeability, the composition ratio of the resin binder in the first end portion and the second end portion is preferably not lower than 8 mass % and not higher than 20 mass %, more preferably not lower than 8 mass % and not higher than 18 mass %, further preferably not lower than 8 mass % and not higher than 15 mass %, and most preferably not lower than 8 mass % and not higher than 12 mass %.

By setting the composition ratio of the resin binder in the central portion to be not lower than 2 mass % and not higher than 7 mass %, ion permeability in the entire heat resistance layer can be enhanced and integrity and adhesion of each portion of the heat resistance layer can be ensured. From a point of view of ion permeability, the composition ratio of the resin binder in the central portion is preferably not lower than 2 mass % and not higher than 4 mass %.

The heat resistance layer as a whole has a thickness, for example, approximately not smaller than 3.5 µm and not greater than 12 µm. From a point of view of ion permeability and resistance to overcharging, the first end portion and the second end portion each have a thickness preferably not smaller than 1 µm and not greater than 3 µm, and the central portion has a thickness preferably not smaller than 1.5 µm and not greater than 6 µm. From the same point of view, the first end portion and the second end portion have a thickness more preferably not smaller than 1 µm and not greater than 2 µm, and the central portion has a thickness more preferably not smaller than 1.5 µm and not greater than 4 µm. The first end portion and the second end portion may be equal to each other or different from each other in thickness.

The central portion is preferably greater in thickness than the first end portion and the second end portion. A ratio of the thickness of the central portion to the thickness of the heat resistance layer as a whole is preferably not lower than 27%, more preferably not lower than 50%, and further preferably not lower than 60%.

<<Electrode>>

The electrode faces the heat resistance layer. The positive electrode, the negative electrode, or both of the positive electrode and the negative electrode may face the heat resistance layer. Namely, at least one of the positive electrode and the negative electrode faces the heat resistance layer. According to the studies conducted by the present inventor, a construction in which only the negative electrode faces the heat resistance layer efficiently exhibits the effect expected in the present embodiment.

(Positive Electrode)

Figure 4:
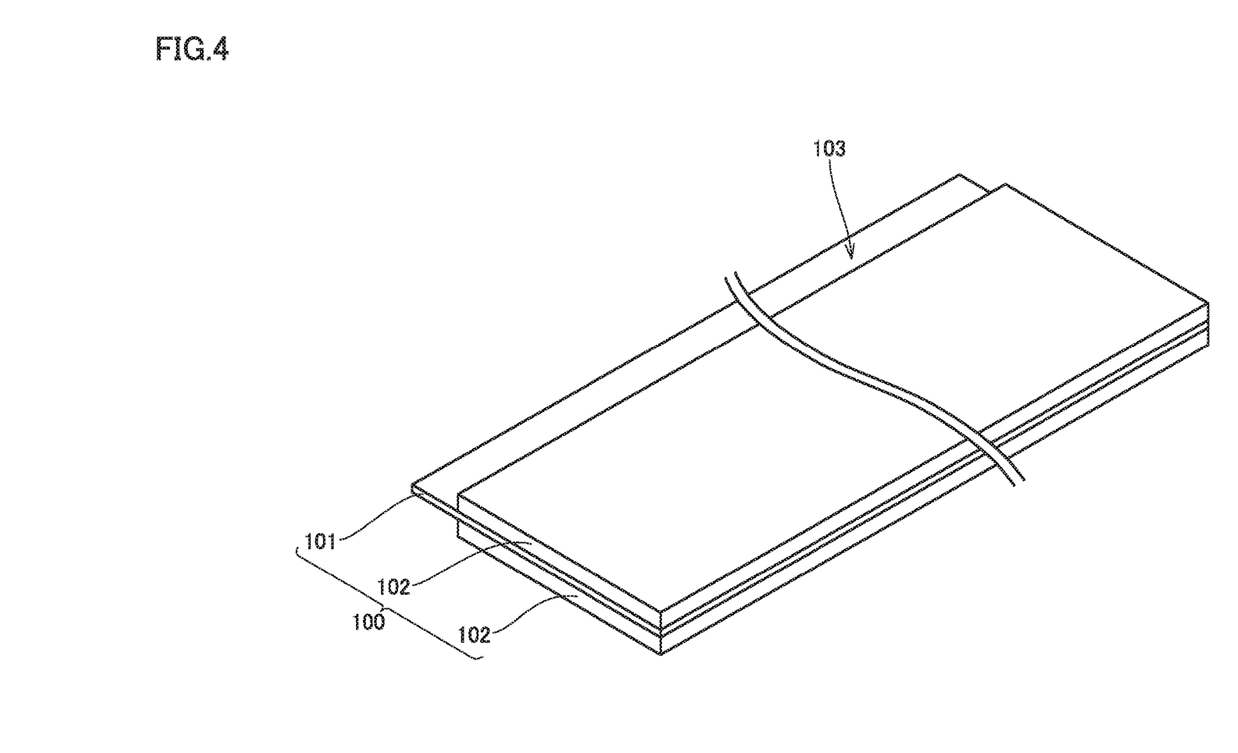
FIG. 4 is a schematic diagram showing one example of a construction of a positive electrode.

FIG. 4 is a schematic diagram showing one example of a construction of the positive electrode. Positive electrode 100 includes a positive electrode current collector 101 and a positive electrode composite material layer 102 arranged on a surface of positive electrode current collector 101. Positive electrode composite material layer 102 is arranged on both surfaces of positive electrode current collector 101. Positive electrode 100 has a thickness (a total of a thickness of positive electrode current collector 101 and a thickness of positive electrode composite material layer 102), for example, approximately from 40 to 100 µm (typically, approximately from 50 to 90 µm).

Current-collector-exposed portion 103 in which positive electrode current collector 101 is exposed through positive electrode composite material layer 102 serves as a portion of connection to positive electrode terminal 501 (external terminal) in electrode assembly 800 (see FIG. 1). The positive electrode current collector may be formed, for example, from an Al foil. Positive electrode current collector 101 has a thickness, for example, approximately from 5 to 25 µm.

The positive electrode composite material layer is obtained by applying a positive electrode composite material to a surface of the positive electrode current collector. The positive electrode composite material contains a positive electrode active material, a conductive material, and a resin binder. The positive electrode composite material contains, for example, approximately 80 to 98 mass % of the positive electrode active material. The positive electrode active material is typically an Li-containing metal oxide. The Li-containing metal oxide may have, for example, a crystal structure of a lamellar rock salt type or a crystal structure of a spinel type or an olivine type.

Examples of the Li-containing metal oxide include $LiCoO_2$, $LiNiO_2$, a compound expressed by a general formula $LiNi_aCo_bO_2$ (where a+b=1, 0<a<1, 0<b<1), $LiMnO_2$, $LiMn_2O_4$, a compound expressed by a general formula $LiNi_aCo_bMn_cO_2$ (where a+b+c=1, 0<a<1, 0<b<1, 0<c<1), and $LiFePO_4$. Here, examples of the compound expressed by the general formula $LiNi_aCo_bMn_cO_2$ include $LiNi_{1/3}Co_{1/3}Mn_{1/3}O_2$.

The positive electrode composite material contains, for example, approximately 1 to 10 mass % of the conductive material. The conductive material may be, for example, carbon black such as acetylene black or thermal black, carbon fibers, or graphite.

The positive electrode composite material contains, for example, approximately 1 to 10 mass % of the resin binder. The resin binder for the positive electrode may be composed, for example, of PVDF or PTFE.

(Negative Electrode)

Figure 5:
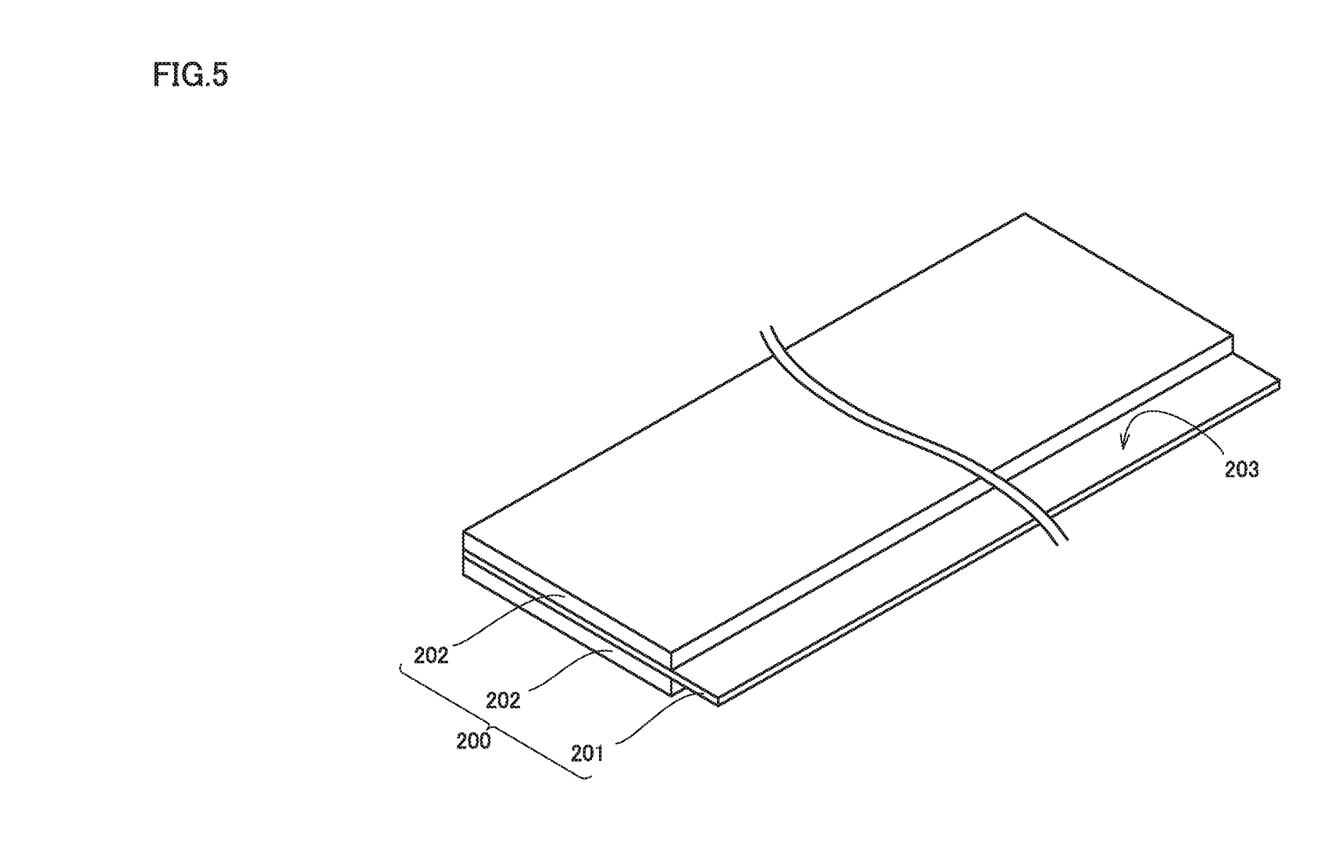
FIG. 5 is a schematic diagram showing one example of a construction of a negative electrode.

FIG. 5 is a schematic diagram showing one example of a construction of the negative electrode. Negative electrode 200 includes a negative electrode current collector 201 and a negative electrode composite material layer 202 arranged on a surface of negative electrode current collector 201. Negative electrode composite material layer 202 is arranged on both surfaces of negative electrode current collector 201. Negative electrode 200 has a thickness (a total of a thickness of negative electrode current collector 201 and a thickness of negative electrode composite material layer 202), for example, approximately from 50 to 150 µm (typically, approximately from 70 to 130 µm).

Current-collector-exposed portion 203 where negative electrode current collector 201 is exposed through negative electrode composite material layer 202 serves as a portion of connection to negative electrode terminal 502 (external terminal) in electrode assembly 800 (see FIG. 1). The negative electrode current collector may be formed, for example, from a copper (Cu) foil. Negative electrode current collector 201 has a thickness, for example, approximately from 5 to 25 μm.

The negative electrode composite material layer is obtained by applying a negative electrode composite material to a surface of the negative electrode current collector. The negative electrode composite material contains a negative electrode active material and a resin binder. The negative electrode composite material contains, for example, approximately 90 to 99 mass % of the negative electrode active material. The negative electrode active material may be a carbon-based negative electrode active material such as graphite, soft carbon, or hard carbon, or an alloy-based negative electrode active material containing silicon (Si) or tin (Sn).

Graphite may be natural graphite or artificial graphite. The negative electrode active material may be, for example, spheroidized graphite obtained by subjecting natural flake graphite to spheroidization. The negative electrode active material may be, for example, composite particles obtained by attaching amorphous carbon to a surface of spheroidized graphite. The negative electrode active material in such a form is herein denoted as "amorphous coated graphite."

The negative electrode composite material contains, for example, approximately 1 to 10 mass % of the resin binder. The resin binder for the negative electrode may be composed, for example, of SBR, acrylonitrile butadiene rubber (NBR), or PTFE. The negative electrode composite material may contain sodium carboxymethylcellulose (CMC-Na) or sodium polyacrylate (PAA-Na) as a thickener.

A ratio of a capacity of the negative electrode to a capacity of the positive electrode (the capacity of the negative electrode÷the capacity of the positive electrode) may be, for example, approximately from 1.7 to 2.0 in the present embodiment.

<<Electrolyte Solution>>

An electrolyte solution is a liquid electrolyte obtained by dissolving Li salt as a supporting salt in an aprotic solvent. The aprotic solvent includes, for example, cyclic carbonates such as ethylene carbonate (EC), propylene carbonate (PC), butylene carbonate (BC), and γ-butyrolactone (γBL) and chain carbonates such as dimethyl carbonate (DMC), ethyl methyl carbonate (EMC), and diethyl carbonate (DEC). The aprotic solvent may be a mixed solvent obtained by mixing two or more of the solvents above. A ratio of mixing between the cyclic carbonate and the chain carbonate in the mixed solvent may be, for example, cyclic carbonate:chain carbonate=1:9 to 5:5 in volume ratio. In such a range, balance between electric conductivity and electrochemical stability is good.

Examples of Li salt include $LiPF_6$, $LiBF_4$, $LiClO_4$, $LiAsF_6$, $Li[(FSO_2)_2N]$ (abbreviated as "LiFSI"), $Li[(CF_3SO_2)_2N]$ (abbreviated as "LiTFSI"), and $Li[CF_3SO_3]$. Among these, $LiPF_6$ and LiFSI are particularly suitable. A concentration of the Li salt is preferably approximately from 0.5 to 2.0 mol/l (mole/liter), more preferably approximately from 0.8 to 1.4 mol/l, and particularly preferably approximately from 1.0 to 1.2 mol/l. Balance between resistance to charging and discharging under a high load and resistance to overcharging is good in such a range.

Other than the component above, the electrolyte solution may contain various additives. Examples of applicable additives include Li salt having as anion, such an oxalate complex as $Li[(C_2O_4)_2B]$ (abbreviated as "LiBOB"), $Li[(C_2O_4)BF_2]$, and $Li[(C_2O_4)_2PF_2]$, as well as vinylene carbonate (VC), fluoroethylene carbonate (FEC), ethylene sulfite (ES), propane sultone (PS), $Li[PO_2F_2]$, cyclohexylbenzene (CHB), and biphenyl (BP).

<Method of Manufacturing Non-Aqueous Electrolyte Secondary Battery>

Figure 6:
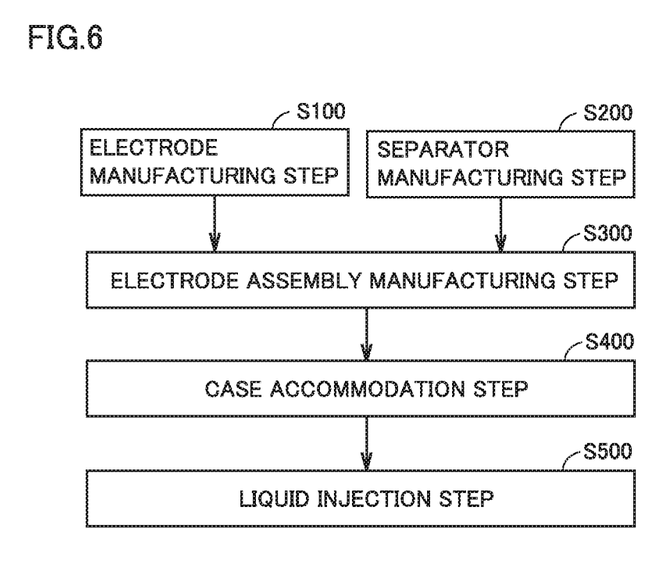
FIG. 6 is a flowchart showing overview of a method of manufacturing a non-aqueous electrolyte secondary battery.

A method of manufacturing a non-aqueous electrolyte secondary battery in the present embodiment will now be described. FIG. 6 is a flowchart showing overview of a method of manufacturing a non-aqueous electrolyte secondary battery. The method of manufacturing a non-aqueous electrolyte secondary battery includes an electrode manufacturing step (S100), a separator manufacturing step (S200), an electrode assembly manufacturing step (S300), a case accommodation step (S400), and a liquid injection step (S500). The manufacturing method is characterized by the separator manufacturing step. Each step will be described below.

<<Electrode Manufacturing Step (S100)>>

In the electrode manufacturing step, the positive electrode and the negative electrode are manufactured. Initially, a paste containing an electrode active material and a resin binder is prepared. A kneader mixer such as a planetary mixer can be used for preparing a paste. A solvent for the paste can be changed as appropriate depending on a type of the resin binder. For example, when PVDF is employed as the resin binder, NMP can be employed as the solvent, and when SBR is employed as the resin binder, water can be employed as the solvent.

Then, the surface of an electrode current collector is coated with the paste and the paste is dried. An electrode composite material layer is thus formed. For example, a die coater can be used for coating with the paste. For example, a hot air dryer can be used for drying the paste. An amount of coating with the paste can be changed as appropriate in accordance with the specifications of the battery. Thereafter, an electrode (for example, positive electrode 100 shown in FIG. 4 and negative electrode 200 shown in FIG. 5) can be manufactured by compressing the electrode composite material layer with the use of a rolling machine and cutting the electrode composite material layer to a prescribed dimension with the use of a slitter.

<<Separator Manufacturing Step (S200)>>

Figure 7:
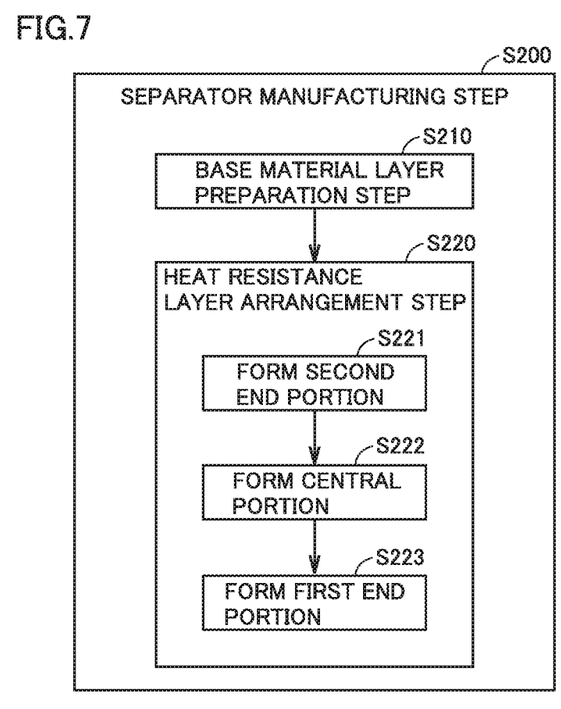
FIG. 7 is a flowchart showing overview of a separator manufacturing step.

In the separator manufacturing step, a separator in which a heat resistance layer is arranged on a surface of a base material layer is manufactured. FIG. 7 is a flowchart showing overview of the separator manufacturing step. The separator manufacturing step (S200) includes a base material layer preparation step (S210) and a heat resistance layer arrangement step (S220).

(Base Material Layer Preparation Step (S210))

Initially, a base material layer is prepared. A base material layer formed from a porous film made of polyolefin may be prepared, for example, with a stretching method or a phase separation method.

(Heat Resistance Layer Arrangement Step (S220))

Then, a heat resistance layer is arranged on a surface of the base material layer by successively forming a second end portion, a central portion, and a first end portion on the surface of the base material layer. The heat resistance layer arrangement step (S220) includes the steps of forming a second end portion (S221), forming a central portion (S222), and forming a first end portion (S223) in this order. The heat resistance layer may be arranged on one surface of the base material layer or on both surfaces thereof. As described previously, in the present embodiment, the first end portion and the second end portion are different from the central portion in solvent base for a paste.

For example, a dispersion/emulsification machine (for example, "Clearmix" manufactured by M Technique Co., Ltd.) can be used for preparing a paste which should form the heat resistance layer. A paste can be prepared by dispersing inorganic particles and a resin binder in a solvent (a water based solvent or an organic solvent) by using the dispersion/emulsification machine.

When an organic solvent and an organic solvent based binder are employed for a paste which should form the first end portion and the second end portion, a water based solvent and a water based binder are employed for a paste which should form the central portion. Alternatively, when a water based solvent and a water based binder are employed for a paste which should form the first end portion and the second end portion, an organic solvent and an organic solvent based binder are employed for a paste which should form the central portion.

For example, a gravure coater is suitable for coating with a paste. Alternatively, a spray coater may be employed. In order to prevent portions from being compatible with each other, desirably, coating with a paste which should form the second end portion and drying of the paste are carried out, and thereafter coating with a paste which should form the central portion is carried out. Similarly, desirably, coating with a paste which should form the central portion and drying of the paste are carried out, and thereafter coating with a paste which should form the first end portion is carried out.

The heat resistance layer can be arranged on the surface of the base material layer by successively forming the second end portion, the central portion, and the first end portion as set forth above. The separator is manufactured as above.

<<Electrode Assembly Manufacturing Step (S300)>>

In the electrode assembly manufacturing step, an electrode assembly is manufactured. A winding assembly is manufactured by stacking the positive electrode, the negative electrode, and the separator and winding these components by using a prescribed winding apparatus such that the separator is interposed between the positive electrode and the negative electrode. Tension applied to the separator during winding (a value per cross-sectional area of the separator) is, for example, approximately from 0.35 to 4.3 N/mm$^2$.

Here, as shown in FIG. 2, positive electrode 100 and negative electrode 200 are arranged to face each other such that current-collector-exposed portion 103 and current-collector-exposed portion 203 are exposed through separator 300. The winding assembly is formed into a flat shape by using, for example, a flat plate press. Electrode assembly 800 shown, for example, in FIG. 2 is thus manufactured. A temperature may be increased during press-forming.

<<Case Accommodation Step (S400)>>

In the case accommodation step, the electrode assembly is accommodated in a battery case. For example, battery case 500 shown in FIG. 1 is prepared. Positive electrode terminal 501 and negative electrode terminal 502 provided in battery case 500 are connected to electrode assembly 800. Thereafter, electrode assembly 800 is accommodated in battery case 500.

<<Liquid Injection Step>>

In the liquid injection step, an electrolyte solution is injected into the battery case. The electrolyte solution can be injected, for example, through a liquid injection port provided in the battery case. After injection, the battery case is hermitically sealed. The non-aqueous electrolyte secondary battery is manufactured as above.

The features of the method of manufacturing a non-aqueous electrolyte secondary battery disclosed above are summarized as follows.

[4] A method of manufacturing a non-aqueous electrolyte secondary battery is a method of manufacturing a non-aqueous electrolyte secondary battery including a separator and an electrode, the separator including a base material layer and a heat resistance layer arranged on a surface of the base material layer, the heat resistance layer containing inorganic particles and a resin binder, and the electrode facing the heat resistance layer, and the method includes the steps of preparing the base material layer and arranging the heat resistance layer on a surface of the base material layer, the step of arranging the heat resistance layer including the steps of forming a second end portion by coating the surface of the base material layer with a first paste followed by drying, forming a central portion by coating a surface of the second end portion with a second paste followed by drying, and forming a first end portion by coating a surface of the central portion with a third paste followed by drying, and the first paste and the third paste containing an organic solvent based binder as the resin binder and the second paste containing a water based solvent as the resin binder, or the first paste and the third paste containing the water based binder as the resin binder and the second paste containing the organic solvent based binder as the resin binder.

According to such a manufacturing method, a non-aqueous electrolyte secondary battery achieving improved adhesion between the heat resistance layer and the electrode and improved adhesion between the heat resistance layer and the base material layer can be manufactured.

Though the present embodiment has been described above with reference to a prismatic battery, the present embodiment is not limited to the prismatic battery. The present embodiment may be applied, for example, to a cylindrical battery or a laminate type battery. The electrode assembly is not limited to the winding type either. The electrode assembly may be of a stack type. The electrode assembly of the stack type refers to an electrode assembly obtained by stacking a plurality of stack units each including a positive electrode, a separator, and a negative electrode as being stacked in this order.

The present embodiment is particularly suitable for applications requiring charging and discharging under a high load. For example, such applications include a large battery to be mounted on vehicles.

EXAMPLES

Though the present embodiment will be described hereinafter with reference to Examples, the present embodiment is not limited to examples below.

<Fabrication of Non-Aqueous Electrolyte Secondary Battery>

<<Separator>>

Various batteries including various separators were manufactured and battery performance was evaluated. A battery with "*" preceding "battery No." such as "No.*1" represents a Comparative Example and a battery without "*" preceding "battery No." such as "No. 1" represents an Example in Tables 1 and 2 below.

Various base material layers shown in Table 1 were prepared. In Table 1, "PP Layer/PE Layer/PP Layer" represents a base material layer having a three-layered structure in which the PP layer, the PE layer, and the PP layer are stacked in this order. "PP Layer/PE Layer" represents a base material layer having a two-layered structure in which the PP layer and the PE layer are stacked.

TABLE 1

| Battery No. | Stack Construction | Base Material Layer PP Layer μm | PE Layer μm | Arrangement of Heat Resistance Layer |
|---|---|---|---|---|
| *1 | PP Layer/PE Layer/PP Layer | 4 | 6 | Negative-Electrode Facing Surface |
| 1 | PE Layer | — | 16 | Negative-Electrode Facing Surface |
| 2 | PP Layer/PE Layer/PP Layer | 4 | 6 | Negative-Electrode Facing Surface |
| 3 | PP Layer/PE Layer/PP Layer | 4 | 6 | Negative-Electrode Facing Surface |
| 4 | PP Layer/PE Layer/PP Layer | 4 | 6 | Negative-Electrode Facing Surface |
| *2 | PP Layer/PE Layer/PP Layer | 4 | 6 | Negative-Electrode Facing Surface |
| *3 | PP Layer/PE Layer/PP Layer | 4 | 6 | Positive-Electrode Facing Surface |
| 5 | PP Layer/PE Layer | 4 | 12 | Positive-Electrode Facing Surface |
| 6 | PP Layer/PE Layer/PP Layer | 4 | 6 | Positive-Electrode Facing Surface |
| 7 | PP Layer/PE Layer/PP Layer | 4 | 6 | Positive-Electrode Facing Surface |
| 8 | PP Layer/PE Layer/PP Layer | 4 | 6 | Positive-Electrode Facing Surface |
| *4 | PP Layer/PE Layer/PP Layer | 4 | 6 | Positive-Electrode Facing Surface |
| *5 | PP Layer/PE Layer/PP Layer | 4 | 6 | Both Surfaces |
| 9 | PP Layer/PE Layer/PP Layer | 4 | 6 | Both Surfaces |
| 10 | PP Layer/PE Layer/PP Layer | 4 | 6 | Both Surfaces |
| 11 | PP Layer/PE Layer/PP Layer | 4 | 6 | Both Surfaces |
| 12 | PE Layer | — | 18 | Both Surfaces |
| *6 | PP Layer/PE Layer/PP Layer | 4 | 6 | Both Surfaces |

The heat resistance layer constructed as shown in Table 2 was arranged on the surface(s) of the base material layer shown in "Arrangement of Heat Resistance Layer" in Table 1, with the method described previously. In Table 1, the "Negative-Electrode Facing Surface" refers to a surface of the base material layer which faces the negative electrode in the electrode assembly, the "Positive-Electrode Facing Surface" refers to a surface of the base material layer which faces the positive electrode in the electrode assembly, and "Both Surfaces" refers to both surfaces of the base material layer. In Table 2, "Acrylic" shown in a field of a type of the resin binder refers to the acrylic resin described previously.

TABLE 2

Heat Resistance Layer

| | First End Portion | | | | | Central Portion | | | | | |
|---|---|---|---|---|---|---|---|---|---|---|---|
| | Inorganic Particles | | | Resin Binder | | | Inorganic Particles | | Resin Binder | | |
| Battery No. | Thickness μm | Type | Composition Ratio Mass % | Type | Composition Ratio Mass % | Solvent | Thickness μm | Type | Composition Ratio Mass % | Type | Composition Ratio Mass % | Solvent |
| *1 | 1 | Alumina | 95 | PVDF | 5 | NMP | 1.5 | Alumina | 96 | Acrylic | 4 | Water |
| 1 | 1 | Zirconia | 92 | PVDF | 8 | NMP | 1.5 | Alumina | 96 | Acrylic | 4 | Water |
| 2 | 1 | Alumina | 85 | PVDF | 15 | NMP | 1.5 | Boehmite | 96 | Acrylic | 4 | Water |
| 3 | 1 | Alumina | 85 | Acrylic | 15 | Water | 1.5 | Magnesia | 96 | PVDF | 4 | NMP |
| 4 | 1 | Boehmite | 70 | PVDF | 30 | NMP | 1.5 | Boehmite | 96 | Acrylic | 4 | Water |
| *2 | 1 | Alumina | 65 | PVDF | 35 | NMP | 1.5 | Alumina | 96 | Acrylic | 4 | Water |
| *3 | 2 | Boehmite | 80 | PVDF | 20 | NMP | 4 | Boehmite | 96 | Acrylic | 4 | Water |
| 5 | 2 | Alumina | 80 | PVDF | 20 | NMP | 4 | Alumina | 96 | Acrylic | 4 | Water |
| 6 | 2 | Boehmite | 80 | PVDF | 20 | NMP | 4 | Boehmite | 96 | Acrylic | 4 | Water |
| 7 | 2 | Alumina | 80 | Acrylic | 20 | Water | 4 | Alumina | 96 | PVDF | 4 | NMP |
| 8 | 2 | Magnesia | 80 | PVDF | 20 | NMP | 4 | Magnesia | 96 | Acrylic | 4 | Water |
| *4 | 2 | Alumina | 80 | PVDF | 20 | NMP | 4 | Alumina | 96 | Acrylic | 4 | Water |
| *5 | 3 | Alumina | 82 | PVDF | 18 | NMP | 6 | Boehmite | 99 | Acrylic | 1 | Water |
| 9 | 3 | Alumina | 82 | PVDF | 18 | NMP | 6 | Alumina | 98 | Acrylic | 2 | Water |
| 10 | 3 | Boehmite | 82 | PVDF | 18 | NMP | 6 | Magnesia | 96 | Acrylic | 4 | Water |
| 11 | 3 | Alumina | 82 | Acrylic | 18 | Water | 6 | Alumina | 96 | PVDF | 4 | NMP |
| 12 | 3 | Alumina | 82 | PVDF | 18 | NMP | 6 | Zirconia | 93 | Acrylic | 7 | Water |
| *6 | 3 | Boehmite | 82 | PVDF | 18 | NMP | 6 | Alumina | 91 | Acrylic | 9 | Water |

| | Heat Resistance Layer Second End Portion | | | | | | Battery Performance | |
|---|---|---|---|---|---|---|---|---|
| | Inorganic Particles | | | Resin Binder | | | Rate | |
| Battery No. | Thickness μm | Type | Composition Ratio Mass % | Type | Composition Ratio Mass % | Solvent | of Increase in Resistance % | Rate of Increase in Temperature % |
| *1 | 3 | Alumina | 85 | PVDF | 15 | NMP | 250 | 103 |
| 1 | 3 | Zirconia | 85 | PVDF | 15 | NMP | 100 | 103 |
| 2 | 3 | Alumina | 85 | PVDF | 15 | NMP | 105 | 103 |
| 3 | 3 | Boehmite | 85 | Acrylic | 15 | Water | 105 | 102 |
| 4 | 3 | Boehmite | 85 | PVDF | 15 | NMP | 110 | 102 |

TABLE 2-continued

| | | | | | | | | |
|---|---|---|---|---|---|---|---|---|
| *2 | 3 | Zirconia | 85 | PVDF | 15 | NMP | 180 | 102 |
| *3 | 2 | Boehmite | 95 | PVDF | 5 | NMP | 106 | 200 |
| 5 | 2 | Alumina | 92 | PVDF | 8 | NMP | 108 | 104 |
| 6 | 2 | Boehmite | 88 | PVDF | 12 | NMP | 109 | 102 |
| 7 | 2 | Alumina | 83 | Acrylic | 17 | Water | 110 | 102 |
| 8 | 2 | Magnesia | 70 | PVDF | 30 | NMP | 112 | 101 |
| *4 | 2 | Alumina | 65 | PVDF | 35 | NMP | 170 | 100 |
| *5 | 1 | Alumina | 82 | PVDF | 18 | NMP | 108 | 200 |
| 9 | 1 | Zirconia | 82 | PVDF | 18 | NMP | 109 | 104 |
| 10 | 1 | Boehmite | 82 | PVDF | 18 | NMP | 111 | 102 |
| 11 | 1 | Alumina | 82 | Acrylic | 18 | Water | 111 | 102 |
| 12 | 1 | Boehmite | 82 | PVDF | 18 | NMP | 115 | 101 |
| *6 | 1 | Boehmite | 82 | PVDF | 18 | NMP | 170 | 100 |

Various separators each including the base material layer and the heat resistance layer arranged on the surface of the base material layer were prepared as above. Features other than the separator in the battery used for evaluation are listed below.

<<Positive Electrode>>

Positive electrode active material: $LiNi_{1/3}Co_{1/3}Mn_{1/3}O_2$

Conductive material: acetylene black (AB)

Resin binder: PVDF

Composition of composite material: [positive electrode active material: AB:PVDF=90:8:2 (mass ratio)]

Positive electrode current collector: Al foil (a thickness of 15 μm)

Thickness of positive electrode: 70 μm

<<Negative Electrode>>

Negative electrode active material: amorphous coated graphite

Thickener: CMC-Na

Resin binder: SBR

Composition of composite material: [negative electrode active material: CMC-Na:SBR=98:1:1 (mass ratio)]

Negative electrode current collector: Cu foil (a thickness of 10 μm)

Thickness of negative electrode: 80 μm

<<Electrode Assembly>>

Height of electrode assembly (height H800 in FIG. 1): 50 mm

Width of electrode assembly (width W800 in FIG. 1): 130 mm

The number of stacks of separator: 130

(The number of stacks of the separator represents the number of stacks of the separator in a direction of stack (a direction of normal in FIG. 1) of the electrode and the separator.)

<<Electrolyte Solution>>

Solvent: [EC:EMC:DMC=3:3:4 (volume ratio)]

Li salt: $LiPF_6$ (1.1 mol/l)

Additive: LiBOB and $Li[PO_2F_2]$

<Evaluation>

Each battery was evaluated as follows. In the description below, a unit "C" for a current represents a current with which a rated capacity of a battery is fully discharged in 1 hour.

1. High-Load Charging and Discharging Cycle Test

One thousand charging and discharging cycles with a set of pulse charging→first rest (pause)→pulse discharging→second rest being defined as one cycle were carried out.

Pulse charging: current=2.5 C, time period=240 seconds

First rest: 120 seconds

Pulse discharging: current=30 C, time period=20 seconds

Second rest: 120 seconds

A rate of increase in resistance (percentage) was calculated by measuring a battery resistance before and after the charging and discharging cycle test and dividing a post-cycle resistance by an initial resistance. Table 2 shows results. A lower rate of increase in resistance indicates better resistance to high-load charging and discharging. A rate of increase in resistance may become high because a gap is produced between the heat resistance layer and the electrode in a process of the charging and discharging cycle and deterioration in performance is aggravated when adhesion between the heat resistance layer and the electrode is low.

2. Overcharging Test

Constant current charging was carried out with a current of 10 C while a temperature of the battery case and a voltage of the battery were monitored. A temperature of the battery (T0) at the time when the base material layer shut down and a temperature of the battery (T1) one second after shut-down were measured. A rate of increase in temperature (percentage) was calculated by dividing T1 by T0. Table 2 shows results. A lower rate of increase in temperature indicates better resistance to overcharging. A rate of increase in temperature may become high because heat shrinkage of the separator takes place and a portion where cut-off of the current is insufficient is produced when adhesion between the heat resistance layer and the base material layer is low.

<Results and Discussion>

From Table 2, the batteries according to Examples in which a composition ratio of the resin binder to the total mass of the inorganic particles and the resin binder in the first end portion and the second end portion is not lower than 8 mass % and not higher than 30 mass % and a composition ratio of the resin binder to the total mass of the inorganic particles and the resin binder in the central portion is not lower than 2 mass % and not higher than 7 mass % are lower in rate of increase in resistance after high-load charging and discharging and lower in rate of increase in temperature in the overcharging test than the batteries in Comparative Examples failing to satisfy such conditions.

This may be because the composition ratio of the resin binder in the first end portion and the second end portion is high and hence adhesion has been improved at the interface between the heat resistance layer and the electrode and the interface between the heat resistance layer and the base material layer. This may also be because the composition ratio of the resin binder in the central portion is lower than in the first end portion and the second end portion and hence ion permeability in the heat resistance layer as a whole has been ensured and deterioration in performance in high-load charging and discharging has been suppressed.

From Table 2, in the present test, an effect of suppression of lowering in performance due to lowering in adhesion of the heat resistance layer to the electrode and the base material layer in a battery in which the first end portion and the second end portion each have a thickness not smaller than 1 µm and not greater than 3 µm and the central portion has a thickness not smaller than 1.5 µm and not greater than 6 µm has been observed. Therefore, improvement in effect of suppression of lowering in performance can be expected by adjusting a thickness within such ranges.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A non-aqueous electrolyte secondary battery comprising:
    a separator; and
    an electrode,
    the separator including a base material layer and a heat resistance layer arranged on a surface of the base material layer,
    the heat resistance layer containing inorganic particles and a resin binder,
    the electrode facing the heat resistance layer,
    the heat resistance layer including, in a direction of thickness of the heat resistance layer, a central portion and a first end portion and a second end portion between which the central portion lies,
    the first end portion including an interface with the electrode,
    the second end portion including an interface with the base material layer,
    a content of the resin binder in the first end portion being not lower than 8 mass % and not higher than 30 mass % based on a total content of the resin binder and the inorganic particles in the heat resistance layer being 100 mass %;
    a content of the resin binder in the second end portion being not lower than 8 mass % and not higher than 30 mass % based on the total content of the resin binder and the inorganic particles in the heat resistance layer being 100 mass %; and
    a content of the resin binder in the central portion being not lower than 2 mass % and not higher than 7 mass % based on the total content of the resin binder and the inorganic particles in the heat resistance layer being 100 mass %.

2. The non-aqueous electrolyte secondary battery according to claim 1, wherein
    the first end portion and the second end portion contain an organic solvent based binder as the resin binder and the central portion contains a water based binder as the resin binder, or
    the first end portion and the second end portion contain the water based binder as the resin binder and the central portion contains the organic solvent based binder as the resin binder.

3. The non-aqueous electrolyte secondary battery according to claim 1, wherein
    the first end portion and the second end portion each have a thickness not smaller than 1 µm and not greater than 3 µm, and
    the central portion has a thickness not smaller than 1.5 µm and not greater than 6 µm.

* * * * *